United States Patent
Coogan et al.

(10) Patent No.: US 12,359,012 B2
(45) Date of Patent: Jul. 15, 2025

(54) WATER-DISPERSIBLE POLYURETHANE

(71) Applicant: COVESTRO (NETHERLANDS) B.V., Geleen (NL)

(72) Inventors: Richard George Coogan, Geleen (NL); Samantha Marchetti, Wilmington, MA (US); Nikole Seil, Wilmington, MA (US); Ronald Tennebroek, Geleen (NL)

(73) Assignee: COVESTRO (NETHERLANDS) B.V., Geleen (NL)

( * ) Notice: Subject to any disclaimer, the term of this patent is extended or adjusted under 35 U.S.C. 154(b) by 448 days.

(21) Appl. No.: 17/800,428

(22) PCT Filed: Mar. 26, 2021

(86) PCT No.: PCT/EP2021/057900
§ 371 (c)(1),
(2) Date: Aug. 17, 2022

(87) PCT Pub. No.: WO2021/204564
PCT Pub. Date: Oct. 14, 2021

(65) Prior Publication Data
US 2023/0089045 A1      Mar. 23, 2023

Related U.S. Application Data

(60) Provisional application No. 63/008,124, filed on Apr. 10, 2020.

(30) Foreign Application Priority Data

Jul. 8, 2020   (EP) ..................... 20184810

(51) Int. Cl.
*C08G 18/50* (2006.01)
*C08G 18/12* (2006.01)
*C08G 18/36* (2006.01)
*C08G 18/42* (2006.01)

(52) U.S. Cl.
CPC ............ *C08G 18/12* (2013.01); *C08G 18/36* (2013.01); *C08G 18/4238* (2013.01); *C08G 18/5039* (2013.01); *C08G 2150/00* (2013.01)

(58) Field of Classification Search
CPC . C08G 18/4238; C08G 18/36; C08G 18/5039
See application file for complete search history.

(56) References Cited

U.S. PATENT DOCUMENTS

| 3,454,530 A * | 7/1969 | Case ................. | C08G 18/4615 528/297 |
|---|---|---|---|
| 4,616,061 A | 10/1986 | Henning et al. | |
| 4,686,240 A | 8/1987 | Bailey, Jr. et al. | |
| 5,053,317 A | 10/1991 | Joerg et al. | |
| 9,790,317 B2 | 10/2017 | Nazaran et al. | |
| 2005/0154177 A1* | 7/2005 | Hille ................. | C08G 18/4211 528/73 |
| 2007/0032594 A1* | 2/2007 | Mazanek ........... | C08G 18/6659 524/589 |
| 2011/0059253 A1* | 3/2011 | Tennebroek ........ | C09D 179/08 524/104 |
| 2011/0086953 A1* | 4/2011 | Tennebroek ....... | C08G 18/4233 524/602 |
| 2012/0095164 A1 | 4/2012 | Harald et al. | |

OTHER PUBLICATIONS

International Search Report for PCT/EP2021/057900, dated Jun. 17, 2021 (6 pages).
Written Opinion of the ISA for PCT/EP2021/057900, dated Jun. 17, 2021 (6 pages).

* cited by examiner

*Primary Examiner* — Michael L Leonard
(74) *Attorney, Agent, or Firm* — Richard P. Bender

(57) ABSTRACT

The present invention relates to an aqueous dispersion comprising dispersed particles comprising a polyurethane comprising at least the following building blocks derived from a) at least one organic polyisocyanate, b) at least one carboxylate group-bearing isocyanate-reactive compound, and c) at least one organic isocyanate-reactive polyol, wherein at least one of the carboxylate group-bearing compounds b) has the following structural formula O II (1) $R_2(R_3)$—N—C—$R_1$-COO$^-$ wherein $R_1$ is a divalent aliphatic hydrocarbon radical having from 2 to 8 carbon atoms or a divalent cycloaliphatic hydrocarbon radical having from 6 to 8 carbon atoms or a divalent aromatic hydrocarbon radical having from 6 to 8 carbon atoms, $R_2$ and $R_3$ are 2-hydroxypropyl.

20 Claims, No Drawings

WATER-DISPERSIBLE POLYURETHANE

This application is the U.S. national phase of International Application No. PCT/EP2021/057900 filed Mar. 26, 2021 which designated the U.S. and claims priority to EP 20184810.8 filed Jul. 8, 2020, and U.S. 63/008,124 filed Apr. 10, 2020, the entire contents of each of which are hereby incorporated by reference.

The present invention relates to aqueous dispersions comprising dispersed particles of a particular water-dispersible polymer comprising urethane bonds, coating composition thereof and a coating obtained by using the coating composition.

Aqueous polyurethane dispersions and their application in coatings are well known in the art. It is well known in the coating industry that polyurethane binders can be applied to a variety of substrates to provide coatings with good mechanical and chemical resistances.

Water-dispersible polyurethanes are made using at least one organic polyisocyanate, at least one organic polyol and a compound designed to provide stability to the dispersion in water. To increase molecular weight, they are usually chain extended after dispersion in water. The chain extension can be accomplished by allowing the terminal isocyanate groups of an isocyanate-terminated polyurethane prepolymer to react with water or by adding a diamine to the initial dispersion that will react more rapidly than water with the isocyanate groups. A very often used compound designed to provide stability to the dispersion in water is 2,2-dimethylol propionic acid, which is used as an ionic precursor; the carboxylic acid groups are neutralized with for example ammonia to impart dispersibility. See for example U.S. Pat. Nos. 9,074,038B2 and 9,790,317B2. 2,2-dimethylol propionic acid is a potentially ionic monomer with a carboxylic acid group and two hydroxyl groups reactive to isocyanate groups and has the following structural formula:

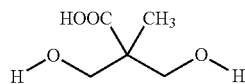

The carboxylic acid group represents the "potentially ionic" group, while the salt-type group obtained by neutralizing the carboxylic acid group into a carboxylate group, is an "ionic" group. The conversion of any potentially ionic water-dispersing groups present in the prepolymer to ionic water-dispersing groups may be obtained by neutralizing before, after or simultaneously with the formation of an aqueous dispersion of the prepolymer.

A disadvantage of the use of 2,2-dimethylol propionic acid is that relative high amounts are needed to make a stable dispersion, resulting in relatively high acid number of the resulting high content of salt groups, i.e. carboxylate groups, of the polyurethane. Polyurethanes with high acid values tend to give species which are outright dissolved in water or result in very small sized particles, both of which result in increased viscosity in the dispersion. Also, the relatively high level of acid groups in the polyurethane tends to render a coating made therefrom intrinsically more water sensitive, less hydrolytically stable and so less durable.

It would therefore be advantageous to employ lower acid values in the polyurethane, although of course not at the expense of vitiating the effectiveness of water-dispersibility and stability of the aqueous dispersion.

The object of the present invention is to provide a water-dispersible polyurethane which can have lower acid number while the stability of an aqueous dispersion of the polyurethane is not negatively affected.

According to the present invention there is provided a water-dispersible polyurethane comprising at least the following building blocks derived from:
  a) at least one organic polyisocyanate,
  b) at least one organic carboxylate group-bearing isocyanate-reactive compound for providing chain-pendant carboxylate ionic dispersing groups in the polyurethane, and
  c) at least one organic isocyanate-reactive polyol, wherein at least one of the carboxylate group-bearing compounds b) has the following structural formula

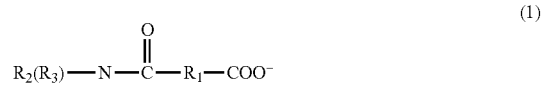

wherein
$R_1$ is a divalent aliphatic hydrocarbon radical having from 2 to 8 carbon atoms, preferably from 3 to 6 carbon atoms, more preferably 3 or 4 carbon atoms or a divalent cycloaliphatic hydrocarbon radical having from 6 to 8 carbon atoms or a divalent aromatic hydrocarbon radical having from 6 to 8 carbon atoms,
$R_2$ and $R_3$ are both 2-hydroxypropyl. The present invention also relates to an aqueous polyurethane dispersion wherein the polyurethane comprises building blocks derived from a), b) and c) as defined above.

It has surprisingly been found that the amide carboxylic acid compound with formula (1) can be used to stabilize polyurethanes into water. Furthermore, it has surprisingly been found that stabilization can be achieved even when using lower amounts of the amide carboxylic acid compound with formula (1) compared to 2,2-dimethylol propionic acid (DMPA), resulting in a lower acid number of the polyurethane, resulting in better water resistance. The polyurethanes of the present invention surprisingly also allows for higher solids dispersions with manageable viscosity, compared to DMPA stabilized polyurethane dispersions. The present invention even allows for aqueous dispersions with solids content in the +45 wt. % range, even in the +50 wt. % range, while the viscosity remains manageable. A high viscosity coating or paint composition is undesired since it will require more effort to apply the coating or paint composition. Higher solids coating or paint compositions are advantageous since it results in that the coating or painting process becomes less labour-intensive and time-consuming, in particular taking into account that prior to applying a successive layer the former layer needs to be sufficiently dry. Thus at lower solids, the coater must apply for example three coats on the substrate rather than two resulting in higher labor cost and longer drying times. Accordingly, with the present invention polyurethanes with low acid value can be obtained and which allow for higher solids dispersions with manageable viscosity. An additional advantage of the present invention is that the polyurethanes of the invention have a narrow particles size distribution. Narrow particle size distribution usually results in better storage stability of aqueous dispersions because of the reduced amount of the fraction of larger particles that are more susceptible to sedimentation. Also there will be a reduced presence of the fraction of very small particles or even solubilized polymer reducing the viscosity of the final dispersion.

U.S. Pat. No. 5,053,317 describes radiation-polymerizable mixtures comprising a solvent based polyurethane containing carboxylate groups and urea groups; in the examples addition product formed from succinic anhydride and diethanolamine is used as reactant for preparing the polyurethane to obtain removal of the uncured coating areas by washing with aqueous solutions. U.S. Pat. No. 4,686,240 relates to a process for preparing water-blown polyurethane foams using certain foam modifiers. In Example 10 the adduct of succinic anhydride and diethanolamine is used as foam modifier. U.S. Pat. No. 4,616,061 describes aqueous solutions or dispersions of polyisocyanate addition products, which contain a quantity of incorporated sulphonate and/or carboxylate groups and optionally ethylene oxide units to guarantee the solubility or dispersibility thereof in water and which polyisocyanate addition products additionally contain acylated urea groups formed by the reaction of acid groups with the in-chain polycarbodiimide groups. These patent publications does not describe aqueous dispersions comprising particles of polyurethane that comprises chain-pendant carboxylate groups incorporated by reacting an amide carboxylic acid compound as defined in the present invention.

For all upper and/or lower boundaries of any range given herein, the boundary value is included in the range given, unless specifically indicated otherwise. Thus, when saying from x to y, means including x and y and also all intermediate values.

The term "aliphatic hydrocarbon group" refers to optionally branched alkyl, alkenyl and alkynyl group. The term "cycloaliphatic hydrocarbon group" refers to cycloalkyl and cycloalkenyl group optionally substituted with at least one aliphatic hydrocarbon group. The term "aromatic hydrocarbon group" refers to a benzene ring optionally substituted with at least one aliphatic hydrocarbon group. The aliphatic hydrocarbon groups are preferably alkyl groups. Examples of cycloaliphatic hydrocarbon groups with 7 carbon atoms are cycloheptyl and methyl substituted cyclohexyl. An example of an aromatic hydrocarbon group with 7 carbon atoms is methyl substituted phenyl. Examples of aromatic hydrocarbon groups with 8 carbon atoms are xylyl and ethyl substituted phenyl.

$R_1$ is a divalent aliphatic hydrocarbon radical having from 2 to 8 carbon atoms, preferably from 3 to 6 carbon atoms, more preferably 3 or 4 carbon atoms or a divalent cycloaliphatic hydrocarbon radical having from 6 to 8 carbon atoms or a divalent aromatic hydrocarbon radical having from 6 to 8 carbon atoms. $R_1$ is preferably an optionally branched $C_2$-$C_6$ alkyl radical, an optionally branched $C_2$-$C_6$ alkenyl radical, a $C_6$-$C_8$ cycloalkyl radical or a $C_6$-$C_8$ cycloalkenyl radical.

$R_2$ and $R_3$ are both 2-hydroxypropyl ($CH_3$—$CH(OH)$—$CH_2$—).

Preferably at least 25 wt. %, more preferably at least 30 wt. %, even more preferably at least 40 wt. %, even more preferably at least 50 wt. %, even more preferably at least 75 wt. %, even more preferably at least 90 wt. % and most preferably 100 wt. % of component b) is according to structural formula (1).

Preferably, the polyurethane is the reaction product of at least

A) at least one organic polyisocyanate,
B') at least one organic carboxylic acid-bearing isocyanate-reactive compound for providing chain-pendant carboxylate ionic dispersing groups in the polyurethane,
C) at least one organic isocyanate-reactive polyol, and
D) at least one neutralizing agent to neutralize at least a part of the carboxylic acid groups, wherein at least one of the carboxylic acid-bearing compounds B') has the following structural formula

(2)

wherein $R_1$, $R_2$ and $R_3$ are as defined above.

The present invention also relates to an aqueous polyurethane dispersion, wherein the polyurethane is the reaction product of at least A) at least one organic polyisocyanate,
B') at least one organic carboxylic acid-bearing isocyanate-reactive compound for providing chain-pendant carbon/late ionic dispersing groups in the polyurethane,
C) at least one organic isocyanate-reactive polyol, and
D) at least one neutralizing agent to neutralize at least a part of the carboxylic acid groups, wherein at least one of the carboxylic acid-bearing compounds B') has the following structural formula

(2)

wherein $R_1$, $R_2$ and $R_3$ are as defined above.

The carboxylic acid-bearing compound B') with structural formula (2) is a diol. More preferably, the carboxylic acid-bearing compound B') with structural formula (2) is the reaction product of at least diisopropanol amine and one cyclic acid anhydride. The cyclic acid anhydride is preferably selected from the group consisting of succinic anhydride, glutaric anhydride, tetrahydrophthalic anhydride, hexahydrophthalic anhydride, phthalic anhydride and any mixture thereof. More preferably, the cyclic acid anhydride is selected from the group consisting of glutaric anhydride, tetrahydrophthalic anhydride, hexahydrophthalic anhydride and any mixture thereof. Most preferably, the cyclic acid anhydride is glutaric anhydride. Most preferably, the carboxylic acid-bearing diol B') with structural formula (2) is the reaction product of glutaric anhydride and diisopropanol amine.

The carboxylic acid-bearing compound B') with structural formula (2) is preferably obtained by reaction of the cyclic acid anhydride with diisopropanol amine at atmospheric pressure and at a temperature at or above the melting point of the cyclic acid anhydride. Typically the reaction temperature is at most 10° C. above the melting point of the cyclic acid anhydride. The carboxylic acid-bearing compound B') can be made in situ and preferably is not isolated. For example, the glutaric based diol with formula

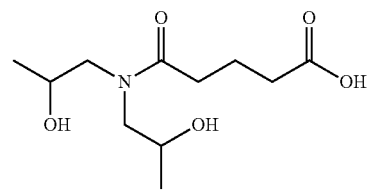 [SMILES: CC(O)CN(CC(C)O)C(=O)CCCC(=O)O]

can for example be prepared by mixing a solution of a diol with diisopropanol amine, heating this mixture to a temperature slightly above the melting point of glutaric anhydride, for example to 60-65° C., adding the glutaric anhydride thereto. To prepare a polyurethane, the diol amide glutaric acid is then further reacted with at least one organic polyisocyanate (A) and at least one organic isocyanate-reactive polyol (C) to yield a higher molecular weight prepolymer. Preferably, the so-obtained higher molecular weight prepolymer is neutralized with a neutralizing agent such as for example triethylamine to obtain a water-dispersible polyurethane and then mixed with water to give an aqueous dispersion of the polyurethane.

It has surprisingly been found that the amount of carboxylic acid-bearing compound B') needed to stabilize the urethane dispersion is less compared to when DMPA is used. Most DMPA containing polyurethanes have acid number of 12 or more to be stable in water. With the amide acid diols according to the present invention polyurethanes can be obtained with acid number as low as 5 while being stable at room temperature for at least 2 weeks, preferably at least 4 weeks, more preferably at least 8 weeks, and most preferably stable at 50° C. for at least 4 weeks. Accordingly, the polyurethane according to the invention can have a lower acid number compared to similar polyurethanes internally stabilized by the use of 2,2-dimethylol propionic acid without negatively affecting the stability of the aqueous dispersion of the polymer. With the carboxylic acid-bearing compound B') with structural formula (2) an acid number down to 5 mg KOH/g of the polyurethane can be obtained, while with 2,2-dimethylol propionic acid an acid number of at least about 12 mg KOH/g of the polyurethane (typically the acid number is between 16 and 22 mg KOH/g) is needed to make a dispersion that is stable without having to add additional external stabilizers, i.e. surfactants, which is advantageous since surfactants impart water-sensitivity to the coating. The polyurethane according to the invention preferably has an acid number within the range of from 5 to 30 mg KOH/g of the polyurethane, more preferably within the range of from 5.5 to 22 mg KOH/g of the polyurethane, even more preferably from 6 to 16 mg KOH/g of the polyurethane, most preferably from 6 to 14 mg KOH/g of the polyurethane. As used herein, the acid number is the mass of potassium hydroxide (KOH) in milligrams that is required to neutralize one gram of solid polymer.

It has furthermore surprisingly been found that the present invention allows to obtain polyurethanes with smaller particle size, compared to urethane dispersions made with DMPA, without having to increase the acid value or even with a lower acid value, while the viscosity remains manageable. The dispersed particles comprising the polyurethane according to the invention advantageously have a particle size of from 15 to 1000 nm, more preferably from 20 to 600 nm, more preferably from 50 to 400 nm and most preferably from 60 to 250 nm. In the context of the present invention, the particle size and particle size distribution are measured as described in the experimental part.

Methods for preparing polyurethanes are known in the art and are described in for example the Polyurethane Handbook $2^{nd}$ Edition, a Carl Hanser publication, 1994, by G. Oertel. The polyurethane may be prepared in a conventional manner by reacting at least A), B') and C) by methods well known in the prior art. Usually an isocyanate-terminated polyurethane pre-polymer is first formed by the reaction of at least components A), B') and C), the carboxyl acid groups are at least partly converted to salt groups by reacting with a neutralizing agent, and the isocyanate-terminated polyurethane pre-polymer (I) is then optionally chain extended with an active hydrogen containing compound (II). In a preferred embodiment, the polyurethane according to the invention is the reaction product of at least (I) an at least partially neutralized isocyanate-terminated polyurethane prepolymer formed by reacting at least (A), (B'), (C) and (D) with a neutralization degree of preferably from 1.25 to 0.25 stoechiometric amounts, more preferably from 0.95 to 0.3 stoechiometric amounts, most preferably from 0.8 to 0.4 stoechiometric amounts, and (II) an active-hydrogen containing chain extending compound. The at least partially neutralized isocyanate-terminated prepolymer is obtained by reacting at least (A), (B'), (C) and (D), whereby the neutralizing agent is added in an amount sufficient to neutralize preferably from 1.25 to 0.25 stoechiometric amounts of the carboxylic acid groups introduced in the prepolymer through the carboxylic acid bearing compounds B'), more preferably from 0.95 to 0.3, most preferably from 0.8 to 0.4 stoechiometric amounts of neutralizing agent to carboxylic acid groups.

In a special embodiment, the value of the multiplication of the acid number of the polyurethane expressed in mg KOH/g (preferably ranging from 5-30 mg KOH/g) with the neutralization degree expressed in stoechiometric amounts (preferably ranging from 1.25 to 0.25) is preferably from 3 to 35, more preferably from 3.5 to 24, more preferably from 4 to 16, most preferably from 4 to 12, especially preferably from 5 to 10. The value of the multiplication of the acid number of the polyurethane expressed in mg KOH/g with the neutralization degree expressed in stoechiometric amounts is also referred herein as to the neutralized acid number.

The polyurethane according to the invention may further comprise building blocks derived from other components than components A), B'), C). The polyurethane according to the invention optionally further comprises building blocks derived from at least one organic isocyanate-reactive monool containing a double bond (component E)) such as for example 2-hydroxyethyl (meth)acrylate, 2-hydroxypropyl (meth)acrylate, 4-hydroxybutyl (meth)acrylate, 3-hydroxy-2,2-dimethylpropyl(meth)acrylate. Preferably, component E) is 2-hydroxyethyl (meth)acrylate. Most preferred component E) is 2-hydroxyethyl methacrylate. The amount of such other component E), relative to the total amount of components used to prepare the polyurethane from which the building blocks of the polyurethane are emanated, is preferably in the range from 0 to 5 wt. %, more preferably from 0 to 4 wt. %, even more preferably from 0 to 3 wt. %. In a particular embodiment, the amount of component E) is in the range of from 0.05 wt. % to 5 wt. %, preferably from 0.1 to 4 wt. %, even more preferably from 0.5 to 3 wt. %, relative to the total amount of components used to prepare the polyurethane from which the building blocks of the polyurethane are emanated.

In case the polyurethane according to the invention is the reaction product of components A), B'), C), D), E) and active-hydrogen containing chain extending compound (II), the total amount of components used to prepare the polyurethane from which the building blocks of the polyurethane are emanated are meant herein the total amount of components A), B'), C) and E), thus excluding the amount of neutralizing agent D) and the amount of the active-hydrogen containing chain extending compound (II).

The present invention further relates to a polyurethane being the reaction product of at least components A), B'), C), D), optionally E) and preferably component II). The components A), B'), C), D), E) and II) and their amounts are as described herein.

Component A)

The organic polyisocyanate A) used for preparing the polyurethane according to the invention is a polyisocyanate containing at least two free isocyanate groups. Preferably the organic polyisocyanate A) comprises at least one diisocyanate $Y(NCO)_2$. Such organic diisocyanate may be an aliphatic (which term includes cycloaliphatic), araliphatic or aromatic polyisocyanate. Preferably, Y represents a divalent aliphatic hydrocarbon radical having from 4 to 10 carbon atoms, more preferably from 5 to 9 carbon atoms, a divalent cycloaliphatic hydrocarbon radical having from 6 to 13 carbon atoms, more preferably from 8 to 13 carbon atoms, a divalent aromatic hydrocarbon radical having from 6 to 13 carbon atoms or a divalent araliphatic hydrocarbon radical having from 7 to 15 carbon atoms.

Examples of suitable aliphatic polyisocyanates include ethylene diisocyanate, 1,6-hexamethylene diisocyanate (HDI), isophorone diisocyanate, cyclohexane-1,4-diisocyanate, 4,4'-dicyclohexyl methane diisocyanate, cyclopentylene diisocyanate, p-tetra-methylxylene diisocyanate (p-TMXDI) and its meta isomer (m-TMXDI), hydrogenated 2,4-toluene diisocyanate, hydrogenated 2,6-toluene diisocyanate, 1-isocyanato-1-methyl-3(4)-isocyanatomethyl-cyclohexane (IMCI), pentamethylene diisocyanate and mixtures thereof. Suitable non-aliphatic polyisocyanates include p-xylylene diisocyanate, 1-4-phenylene diisocyanate, 2,4-toluene diisocyanate, 2,6-toluene diisocyanate, 4,4'-diphenylmethane diisocyanate, 2,4-diphenyl methane diisocyanate, 1,5-naphthylene diisocyanate and mixtures thereof. Mixtures of aliphatic and aromatic polyisocyanates can be used and also polyisocyanates which have been modified by the introduction of urethane, allophanate, urea, biuret, carbodiimide, uretonimine or isocyanurate residues.

The organic polyisocyanate A) is preferably at least one aliphatic diisocyanate. The organic polyisocyanate A) is more preferably selected from the group consisting of hexamethylene diisocyanate, isophorone diisocyanate (1-isocyanato-3,3,5-trimethyl-5-isocyanatomethyl-cyclohexane), methylene dicyclohexyl diisocyanate (4,4'-diisocyanato-dicyclohexyl-methane), the triisocyanurate of hexamethylene diisocyanate, the biuret of hexamethylene diisocyanate and any mixture of these compounds.

The amount of component A) relative to the total weight amount of components used to prepare the polyurethane from which the building blocks of the polyurethane are emanated is preferably from 10 to 59 weight percent, more preferably from 15 to 55 weight percent and even more preferably from 20 to 50 weight percent. As used herein, the building blocks of the polyurethane are emanated from at least components A), B'), C) and optionally E), but not from the neutralizing agent D) and also not from the chain extending compound (II).

Component B')

At least a part of component B') is according to structural formula (2).

Component B') may further comprise isocyanate-reactive compound containing ionic or potentially ionic water-dispersing groups, but with a structural formula different than structural formula (2). Preferred ionic water-dispersing groups are anionic water-dispersing groups. Preferred anionic water-dispersing groups are obtained from carboxylic, phosphoric and/or sulphonic acid groups. Examples of such compounds include carboxyl containing diols other than compounds B') with structural formula (2), for example dihydroxy alkanoic acids such as 2,2-dimethylol propionic acid (DMPA) or 2,2-dimethylolbutanoic acid (DMBA). Alternatively sulfonate groups may be used as anionic water-dispersing groups.

Preferably at least 25 wt. %, more preferably at least 30 wt. %, even more preferably at least 40 wt. %, even more preferably at least 50 wt. %, even more preferably at least 75 wt. %, even more preferably at least 90 wt. % and most preferably 100 wt. % of component B') is according to structural formula (2).

Suitable and preferred examples of the carboxylic acid-bearing compound B') with formula (2) used for preparing the polyurethane according to the invention are described above.

The amount of component B') relative to the total weight amount of components used to prepare the polyurethane from which the building blocks of the polyurethane are emanated is usually from 1 to 15 weight percent, preferably from 2 to 9 weight percent and even more preferably from 2.5 to 6 weight percent.

Component C)

Component C) may be selected from any polyol that can be used in polyurethane synthesis. Component C) is at least one other organic isocyanate-reactive polyol than component B'). Component C) preferably has a number average molecular weight greater than 400 Daltons, more preferably greater than 450 Daltons. Component C) preferably has a number average molecular weight less than or equal to 6000 Daltons, more preferably less than or equal to 3000 Daltons, most preferably less than or equal to 2000 Daltons and especially preferred 1500 Daltons. As used herein, the number average molecular weight of a hydroxyl group containing component is determined by multiplying the equivalent weight of the component with the OH functionality of the component (the OH functionality of the polyol is given by the supplier; in case the polyol is a diol, the OH functionality is 2). The equivalent weight of the component is calculated by dividing 56100 by the OH number of the component. The OH number of the component is measured by titration a known mass of component according to ASTM D4274 and is expressed as mg KOH/g.

In particular component C) may be a polyester polyol, a polyesteramide polyol, a polyether polyol, a polythioether polyol, a polycarbonate polyol, a polyacetal polyol, a polyvinyl polyol and/or a polysiloxane polyol. Preferably, component C) comprises at least one polyol selected from the group consisting of polyester(amide) polyols, polyether polyols, polycarbonate polyols and any mixture thereof. More preferably, component C) comprises at least one polyol selected from the group consisting of polyester polyols, polyether polyols, polycarbonate polyols and any mixture thereof.

Component C) may optionally also comprise an organic isocyanate-reactive diol having a molecular weight of from 62 to 400, preferably from 62 to 450 Daltons such as for example ethylene glycol and hexanediol. The amount of such organic isocyanate-reactive diols, relative to the total amount of components used to prepare the polyurethane from which the building blocks of the polyurethane are emanated, is preferably in the range from 0 to 10 wt. %, more preferably from 0 to 5 wt. %.

In a preferred embodiment, the polyol C) is a polyester polyol, polyether polyol and/or polycarbonate polyol optionally in combination with fatty acid residue containing polyol.

The amount of component C) relative to the total weight amount of components used to prepare the polyurethane from which the building blocks of the polyurethane are emanated is preferably from 40 to 89 weight percent, more preferably from 43 to 83 weight percent and even more preferably from 47.5 to 77.5 weight percent.

Component D)

The conversion of the potentially ionic water-dispersing groups present in the prepolymer (obtained by reacting at least A), B') and C)) to ionic water-dispersing groups may be effected by neutralizing before, after or simultaneously with the formation of an aqueous dispersion of the prepolymer. Preferably, the conversion of the carboxylic acid groups present in the prepolymer obtained by the reaction of at least A), B') and C) to salt groups is effected either before or simultaneously with the addition of water to the prepolymer.

The neutralizing agent D) is a base preferably selected from the group consisting of ammonia, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide.

The neutralising agent is preferably used in such an amount that the molar ratio of the ionic and potentially ionic water dispersing groups to the neutralizing groups of the neutralising agent is in the range of from 0.25 to 1.25, more preferably from 0.3 to 0.95 and even more preferably from 0.4 to 0.8.

In a preferred embodiment of the invention, the amount of component A) is from 10 to 59 weight percent, the amount of component B') is from 1 to 15 weight percent, the amount of component C) is from 40 to 89 weight percent and the amount of component E) is from 0 to 5 weight percent, relative to the total weight amount of components used to prepare the polyurethane from which the building blocks of the polyurethane are emanated. In another preferred embodiment of the invention, the amount of component A) is from 15 to 55 weight percent, the amount of component B') is from 2 to 9 weight percent, the amount of component C) is from 42.9 to 82.9 weight percent and the amount of component E) is from 0.1 to 4 weight percent, relative to the total weight amount of components used to prepare the polyurethane from which the building blocks of the polyurethane are emanated. In another preferred embodiment of the invention, the amount of component A) is from 20 to 50 weight percent, the amount of component B') is from 2.5 to 6 weight percent, the amount of component C) is from 47.0 to 77.0 weight percent and the amount of component E) is from 0.5 to 3 weight percent, relative to the total weight amount of components used to prepare the polyurethane from which the building blocks of the polyurethane are emanated.

Component (II)

Preferably the isocyanate-terminated polyurethane pre-polymer is chain extended with an active hydrogen-containing chain extending compound(s). Active hydrogen-containing chain extending compounds, which may be reacted with the isocyanate-terminated pre-polymer include water, amino-alcohols, primary or secondary diamines or polyamines (including compounds containing a primary amino group and secondary amino group), hydrazine and substituted hydrazines. Examples of such chain extending compounds useful herein include 2-(methylamino)ethylamine, aminoethyl ethanolamine, aminoethylpiperazine, diethylene triamine, and alkylene diamines such as ethylene diamine, and cyclic amines such as isophorone diamine. Also compounds such as hydrazine, azines such as acetone azine, substituted hydrazines such as, for example, dimethyl hydrazine, 1,6-hexamethylene-bis-hydrazine, carbodihydrazide, hydrazides of dicarboxylic acids, adipic acid dihydrazide, oxalic acid dihydrazide, isophthalic acid dihydrazide, (di) amino sulfonates, hydrazides made by reacting lactones with hydrazine, bis-semi-carbazide, and bis-hydrazide carbonic esters of glycols may be useful. Preferably, the chain extending compound is selected from the group consisting of hydrazine, a hydrazide(s), a primary diamine(s), a secondary diamine(s), a compound(s) containing a primary amino group and a secondary amino group, and any mixture thereof.

Preferably the molar ratio between the active hydrogen present in the active-hydrogen chain extending compound other than water to isocyanate (NCO) groups present in the isocyanate-terminated polyurethane pre-polymer is in the range of from 0.5:1 to 1.2:1, more preferably 0.6:1 to 1.1:1, especially 0.75:1 to 1.02:1 and most preferably 0.78:1 to 0.98:1. Preferably, either the isocyanate-terminated polyurethane pre-polymer is blended with an aqueous phase comprising neutralizing agent and the chain extending compound or either the neutralized isocyanate-terminated polyurethane pre-polymer is added to water comprising the chain extending compound or either (and more preferably) the neutralized isocyanate terminated polyurethane is blended with an aqueous phase and after blending the chain extending compound is added.

The polyurethane according to the invention may be prepared by using a fatty acid residue containing polyol, preferably by using an unsaturated fatty acid residue containing polyol as polyol C). Usually the fatty acid residue is attached via an ester bond or amide bond. Fatty acids are carboxylic acids with short, medium or long aliphatic chains which may be straight or branched, saturated or unsaturated. The saturated types may contain 4 to 26 carbons, preferably 8 to 20 carbons. The unsaturated types may contain 14 to 22 carbons, preferably 16 to 20 carbons. The amount of fatty acid residue is preferably within the range of from 20 to 60 wt. %, more preferably from 25 to 50 wt. %, most preferably from 30 to 45 wt. %, relative to the total weight amount of components used to prepare the polyurethane from which the building blocks of the polyurethane are emanated. For the purpose of determining the fatty acid residue content of the polyurethane, it is convenient to use the weight of the fatty acid reactant including the ester group formed by the terminal acid group of the fatty acid molecule. As used herein 'fatty acid residue', means fatty acids, simple derivatives thereof (such as esters (e.g. $C_{1-4}$alkyl esters), salts thereof, soaps, oils, fats and/or waxes and mixtures thereof. Fatty acid residues may be obtained from natural and/or artificial sources. Natural sources include animal sources and/or plant sources. Animal sources may comprise animal fat, butter fat, fish oil, lard, liver fats, sperm whale oil and/or tallow oil and waxes. Examples of waxes are beeswax, candelia and/or montan. Plant sources may comprise waxes and/or oils such as vegetable oils and/or non-vegetable oils. Examples of plant oils are: bitter gourd, borage, calendula, canola, castor, china wood, coconut, conifer seed, corn, cottonseed, dehydrated castor, flaxseed, grape seed, *Jacaranda mimosifolia* seed, linseed, olive, palm, palm kernel, peanut, pomegranate seed, rapeseed, safflower, snake gourd, soya(bean), sunflower, tung, and/or wheat germ. Artificial sources include synthetic waxes (such as micro crystalline and/or paraffin wax), distilling tall oil (a by-product of processing pine wood) and/or synthesis (for example by chemical and/or biochemical methods). Suitable fatty acids also include (Z)-hexadan-9-enoic [palmitoleic] acid $(C_{16}H_{30}O_2)$, (Z)-octadecan-9-enoic [oleic] acid $(C_{18}H_{34}O_2)$, (9Z,11E,13E)-octadeca-9,11,13-trienoic [α(alpha)-eleostearic also a-oleostearic] acid ($C_{18}H_{30}O_2$) (where α-eleostearic acid comprises >65% of the fatty acids of tung oil), licanic acid, (9Z,12Z)-octadeca-9,12-dienoic [linoleic] acid ($C_{18}H_{32}O_2$), (5Z,8Z,11Z,14Z)-eicosa-5,8,11,14-tetraenoic acid [arachidonic acid] ($C_{20}H_{32}O_2$), 12-hydroxy-(9Z)-octadeca-9-enoic [ricinoleic] acid ($C_{18}H_{34}O_3$), (Z)-docosan-13-enoic [erucic] acid ($C_{22}H_{42}O_2$), (Z)-eicosan-9-enoic [gadoleic] acid ($C_{20}H_{38}O_2$), (7Z,10Z,13Z,16Z,19Z)-docosa-7,10,13,16,19-pentaenoic [clupanodonic] acid and/or combinations thereof. Preferred fatty acids are tall oil fatty acids, sunflower fatty acids, soybean fatty acids. Preferably the fatty acids have a linoleic acid content of at least 20 wt %, more preferably at least 30 wt %, most preferably at least 40 wt %.

Polyurethanes containing building blocks derived from unsaturated fatty acid residues are also referred to in the art as urethane alkyds, also referred to as uralkyds, see for example Autoxidizable urethane resins, D A Wicks and Z W Wicks, Progress in Organic Coatings Nov 2005, pg 141-149). Preferred uralkyd resins are formed from reactants comprising a polyisocyanate (usually a diisocyanate) and an unsaturated fatty acid residue containing ester polyol. The resulting unsaturation in the polyurethane imparts latent crosslinkability so that when a coating composition thereof is dried in the air (often in conjunction with a metal drier salt) the film coating material undergoes crosslinking by the presence of oxygen in the air, thereby improving its properties, e. g. its chemical resistance, hardness and durability.

The present invention relates to an aqueous dispersion comprising dispersed particles comprising the polyurethane as defined in the present invention. The dispersed particles are preferably present in the aqueous dispersion in an amount of from 20 to 60 wt. %, more preferably from 35 to 58 wt. %, even more preferably from 40 to 57 wt. %, most preferably from 45 to 55 wt. % relative to the aqueous dispersion, while the viscosity of the dispersion advantageously remains preferably below 1000 mPa·s, more preferably below 800 mPa·s, more preferably below 500 mPa·s and most preferably below 300 mPa·s. The dispersed particles may further include at least one other polymer which is not the polyurethane according to the invention. Preferably, the at least one other polymer is an addition polymer obtained by the free-radical addition polymerization of at least one vinyl monomer. While such dispersions may include the polyurethane and vinyl polymers as a simple blend of the preformed polymers, it is also known to be more advantageous to form the vinyl polymer in-situ by polymerizing one or more vinyl monomers in the presence of a preformed aqueous polyurethane dispersion. Such in-situ formation of the vinyl polymer can be advantageous in that it may result in greater stability and may further improve the performance of the resulting coating in comparison to simple blending. It would therefore be most desirable to apply the foregoing technology to the provision of an aqueous dispersion of a polyurethane of the type discussed above which additionally incorporates an in-situ formed vinyl polymer.

The present invention therefore further relates to a polyurethane-vinyl polymer hybrid obtained by free-radical polymerization of at least one vinyl monomer in the presence of a polyurethane as described herein above and to an aqueous dispersion comprising dispersed polyurethane-vinyl polymer hybrid particles.

By a polyurethane-vinyl polymer hybrid is meant that a vinyl polymer is prepared by the free-radical polymerization of vinyl monomer(s) in the presence of a polyurethane by forming an aqueous dispersion of said polyurethane resin and polymerising one or more vinyl monomers to form a vinyl polymer such that said vinyl polymer becomes incorporated in-situ into said aqueous dispersion by virtue of polymerising vinyl monomer(s) used to form the vinyl polymer in the presence of the polyurethane resin.

Preferably the weight ratio of polyurethane to vinyl polymer present in the polyurethane vinyl polymer hybrid is in the range of from 95:5 to 15:85, more preferably from 90:10 to 35:65, more preferably from 90:10 to 50:50, most preferably from 90:10 to 65:35.

The acid number of the polyurethane-vinyl polymer hybrid is preferably within the range of from 5 to 30 mg KOH/g of the polymer hybrid, more preferably from 5.5 to 22 mg KOH/g, even more preferably from 6 to 16 mg KOH and most preferably from 6 to 14 mg KOH/g of the polymer hybrid. The neutralized acid number of the polyurethane-vinyl polymer hybrid is preferably from 3 to 35, more preferably from 3.5 to 24, more preferably from 4 to 16, most preferably from 4 to 12, especially preferably from 5 to 10.

The vinyl polymer(s) is obtained by polymerizing of vinyl monomer(s) using a conventional free radical yielding initiator system. Suitable free radical yielding initiators include mixtures partitioning between the aqueous and organic phases. Suitable free-radical-yielding initiators include inorganic peroxides such as ammonium persulphate, hydrogen peroxide, organic peroxides, such as benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as iso-ascorbic acid. Azo compounds such as azobisisobutyronitrile may also be used. Metal compounds such as Fe.EDTA (EDTA is ethylene diamine tetracetic acid) may also be usefully employed as part of the redox initiator system. The amount of initiator or initiator system to use is conventional, e.g. within the range of 0.05 to 6 wt percent based on the weight of vinyl monomer used.

Examples of vinyl monomers include but are not limited to 1,3-butadiene, isoprene; trifluoro ethyl (meth)acrylate (TFEMA); dimethyl amino ethyl (meth)acrylate (DMAEMA); styrene, a-methyl styrene, (meth)acrylic amides and (meth)acrylonitrile; vinyl halides such as vinyl chloride; vinylidene halides such as vinylidene chloride; vinyl ethers; vinyl esters such as vinyl acetate, vinyl propionate, vinyl laurate; vinyl esters of versatic acid such as VeoVa 9 and VeoVa 10 (VeoVa is a trademark of Resolution); heterocyclic vinyl compounds; alkyl esters of mono-olefinically unsaturated dicarboxylic acids such as di-n-butyl maleate and di-n-butyl fumarate; dialkylitaconates such as dimethyltaconate, diethylitaconate, dibutylitaconate and in particular, esters of acrylic acid and methacrylic acid of formula $CH_2=CR^4-COOR^5$ wherein $R^4$ is H or methyl and $R^5$ is optionally substituted alkyl or cycloalkyl of 1 to 20 carbon atoms (more preferably 1 to 8 carbon atoms) examples of which are methyl methacrylate, ethyl methacrylate, n-butyl (meth)acrylate (all isomers), octyl (meth)acrylate (all isomers), 2-ethylhexyl (meth)acrylate, isopropyl (meth)acrylate and n-propyl (meth)acrylate. Preferred monomers of formula $CH2=CR^4-COOR^5$ include isobornyl (meth)acrylate, butyl (meth)acrylate (all isomers), methyl (meth)acrylate, octyl (meth)acrylate (all isomers) and ethyl (meth)acrylate. Preferably, at least 30 weight percent, more preferably at least 50 weight percent and even more preferably at least 70 weight percent of the total amount of vinyl monomer(s) used to prepare the vinyl polymer is selected from the group consisting of methyl methacrylate, butyl acrylate, butyl methacrylate, acrylonitrile, styrene and mixtures of two or more of said monomers. Preferably, the vinyl monomer(s) used to prepare the vinyl polymer is selected from the group consisting of styrene, methyl methacrylate, butyl acrylate, butyl methacrylate and mixtures thereof. More preferably at least 30 weight percent, preferably at least 50 weight percent and more preferably at least 70 weight percent of the total amount of the vinyl monomer(s) used to prepare the vinyl polymer is selected from styrene or methyl methacrylate.

The vinyl monomers may include vinyl monomers carrying functional groups such as cross-linker groups and/or water-dispersing groups. Such functionality may be introduced directly in the vinyl polymer by free-radical polymerisation, or alternatively the functional group may be introduced by a reaction of a reactive vinyl monomer, which is subsequently reacted with a reactive compound carrying the desired functional group. Examples of suitable vinyl monomers providing crosslinking groups include acrylic and methacrylic monomers having at least one free carboxyl or hydroxyl group, epoxy, acetoacetoxy or carbonyl group, such as acrylic acid and methacrylic acid, glycidyl acrylate, glycidyl methacrylate, aceto acetoxy ethyl methacrylate, allyl methacrylate, tetraethylene glycol dimethacrylate, divinyl benzene and diacetone acrylamide.

Vinyl monomers providing ionic or potentially ionic water-dispersing groups which may be used as additional vinyl monomers include but are not limited to (meth)acrylic acid, itaconic acid, maleic acid, citraconic acid and styrenesulphonic acid. Preferably the level of vinyl monomers providing ionic or potentially ionic water-dispersing groups is between 0 to 5 weight percent, more preferably between 0 and 1 weight percent and most preferably below 0.5 weight percent of the total level of vinyl monomers used.

Vinyl monomers providing non-ionic water-dispersing groups include alkoxy polyethylene glycol (meth)acrylates, preferably having a number average molecular weight of from 140 to 3000, may also be used. Examples of such monomers which are commercially available include methoxypolyethylene glycol (meth)acrylates. Preferably the weight average molecular weight (Mw) of the resultant vinyl polymer is at least 60,000 Daltons, more preferably in the range of from 100,000 to 6,000,000 Daltons and most preferably in the range of from 150,000 to 2,500,000 Daltons.

Coalescing agents (also referred to as coalescents or film-forming assistants) are used in coating composition such as for example paints for optimizing the film formation process of the polymeric binder particles. The film formation process in coating compositions involves the coalescence of the polymeric particles, during and after the evaporation of the diluents (in the present invention mainly water), thereby permitting contact and fusion of adjacent polymeric dispersion particles. Coalescing agents typically reduce the minimal film formation temperature of a coating composition. Non-limited examples of coalescents are organic co-solvents. Organic co-solvents may be added before, during or after polyurethane formation to control the viscosity. Examples of co-solvents also having the function of coalescent include water-miscible solvents such as glycols and glycol ethers such as butyldiglycol, dipropylene glycol methyl ether, alcohols like isopropanol, acetone, methyl ethyl ketone and alkyl ethers of glycol acetates or mixtures thereof.

The prepolymer obtained by the reaction of at least A), B'), C) is preferably facilitated by the addition of from 1 to 40 weight percent of diluent (relative to the total weight amount of components used to prepare the polyurethane prepolymer) in order to reduce the viscosity of the prepolymer, more preferably from 5 to 35 weight percent and even more preferably from 10 to 25 weight percent of diluent is added. Preferably the diluent is added at the start of the reaction of A), B') and C). In case the polyurethane is an uralkyd-vinyl polymer hybrid or a polyurethane-vinyl polymer hybrid the diluent present during reaction of A), B') and C) is preferably a vinyl monomer. Otherwise, the diluent is preferably non protic organic cosolvent(s). Examples of cosolvents include water-miscible solvents such as acetone, methyl ethyl ketone and alkyl ethers of ethylene or propylene glycols and its analogues or alkyl ethers of glycol acetates and its analogues or mixtures thereof. A preferred diluent (d) (other than vinyl monomer(s)) is acetone or methyl ethyl ketone since this can easily be removed from the composition at the end of the polyurethane preparation.

In the present invention, the NCO:OH molar ratio of the polyurethane prepolymer is preferably higher than 1, more preferably from 1.1 to 3 and even more preferably from 1.3 to 2.2.

The present invention further relates to a coating or paint composition comprising the aqueous dispersion according to the present invention and preferably further comprising solvents, pigments, dyes, heat stabilisers, defoamers, fillers, matting agents, UV absorbers and/or antioxidants. More specifically, the aqueous dispersion of the invention can be used in paint applications, even more specifically in trim paint compositions. It is understood herein that a paint is a broader class of paints than a trim paint. A trim paint is customarily used to paint minor surface areas on the surface of a structure such as surfaces of window trim, building fascia, doors and door panels and door trim as opposed to a generic paint which is used to paint walls and facing materials which make up the majority of the building's surface area.

The present invention further relates to a method of coating or painting a substrate comprising applying a coating or paint composition according to the invention to a substrate and causing or allowing the volatiles present in the coating or paint composition to be removed. The coating or paint composition according to the invention may be applied to a wide variety of substrates such as wood optionally containing a primer and a midcoat, metal, plastic, leather, glass, paper or a combination of at least two of these materials. The present invention further relates to a coated or painted substrate obtained by this method.

The present invention is now further illustrated but in no way limited by reference to the following examples. Unless otherwise specified all parts, percentages, and ratios are on a weight basis.

EXAMPLES AND COMPARATIVE EXPERIMENTS

Abbreviations

TDI=Toluene diisocyanate, mixture of 2,4- and 2,6-isomer in a 80/20 weight ratio.
HMDI-12=Dicyclohexylmethane-4,4'-diisocyanate
IPDI=Isophorone diisocyanate
MEK=Methylethyl ketone
IPA=Isopropyl alcohol

Test Methods

Solids content: a 2-gram wet sample is weighed into an aluminium pan on an analytic balance to the 0.001 decimal place. The sample is dried in an oven under partial vacuum at 130 C for 1 hour. The solids percent is the final weight divided by the initial weight.

Particle size & Polydispersity: 1 drop of a wet sample is dissolved into 100 ml of deionized water and 2 ml of this solution is placed into a polystyrene cuvette, approximate concentration used is between 0.5 to 1.0 g dispersion per liter of deionized water. The sample is tested at 22° C.+/−2° C. in a Malvern Zetasizer Nano S90 which reports particle size and polydispersity. The machine uses a scattering angle of 90 degrees, and is programmed to perform three consecutive measurements. A standard deviation of average mean particle size less than 2.5% is ideal. Average particle size is reported based on scattering intensity Polydispersity less than 0.03 indicates a very monodisperse particle size distribution. From 0.03 to below 0.08 indicates a monomodal distribution. From 0.08 to 0.20 is not entirely monomodal. Above 0.20 is very broad distribution, and can be bimodal or polydisperse.

Viscosity: The viscosity of a 100 ml sample is determined using a Brookfield viscometer (model LVDV-I Prime) at 22° C.+/−2° C. using a number 2 spindle at 60 RPM.

pH: The pH measurement is performed by using a calibrated pH meter with a combination electrode. The pH meter is calibrated daily using a two or three point calibration with pH buffers. Electrode is rinsed and dried, then placed into dispersion. Reading is taken when measurement is stabilized.

% Sediment: Percent sediment determination of final dispersion is performed by filling an ampule (which is specially designed for the purpose with clear markings) halfway and diluting one to one with deionized water. Resulting dilute dispersion is mixed well by shaking or inverting the sealed ampule, which is then placed on a Hettich® Rotanta 460 centrifuge, Type 5600-01 for 15 min at 1500 rpm. Sediment is measured by reading lines on ampule where sediment level can be detected visually and multiplying resulting reading by two to accommodate for dilution.

Acid number: The acid number is determined by calculation according the following formula: [number of equivalents acid groups present in 1 gram solid polymer]*56100 The acid number can also be determined according to the ASTM D1639-90(1996)e1. According to the procedure, the sample was dissolved in a good solvent, was titrated with alcoholic potassium hydroxide solution of a known concentration (KOH). The difference in titration volume between the sample and a blank is the measure of the acid value on solids, according to the following formula:

$$AV=[(V_{blank}-V_{sample})*N_{KOH}*56.1]/(W*S/100)$$

where
AV is acid number on solids in mg KOH/g solid material,
$V_{blank}$ is the volume of KOH solution used in the blank,
$V_{sample}$ is the volume of KOH solution used in the sample,
$N_{KOH}$ is the normality of the KOH solution, W is the sample weight in grams and S is the solids content of the sample in %. Measurements are performed in duplicate using a potentiometric endpoint on a Metrohm 702SM Titrino titrator (accepting the measurement if the difference between duplicates is <0.1 mg KOH/g solid material).

Neutralized acid number: Neutralized acid number is calculated by multiplying the above calculated acid number by neutralization degree (expressed in stoechiometric amounts).

Example 1: Preparation of a OH-Terminated Fatty Ester Modified Polyurethane

Into a 1000 ml round bottom flask fitted fora stirrer and nitrogen blanket was charged with 247 g of a diol made from the diepoxide of bisphenol A and a linoleic acid (equivalent weight=450, OH number=120) (0.55 eq.) and 13.3 g of diisopropanol amine (0.2 eq.). The reactor was heated to 60° C. and 11.4 g of glutaric anhydride (0.1eq.) was added over 5 minutes. The reaction of the amine with the anhydride was monitored by infrared until the anhydride band completely disappeared. 42 g of a second polyol (0.14 eq.) made by the reaction of glycerol with linoleic acid (equivalent weight=300, OH number=185) was added along with a nonionic diol 21 g (0.04) made from TDI, diethanol amine and methoxy carbowax 750 from Dow Chemical Company (eq. wt.=510) in a molar ratio of 1:1:1. The mixture was stirred and heated to 60° C. and 52.4 g (0.4 eq.) of HMDI-12 and 44.4 g (0.4 eq.) of IPDI were added. After a few minutes 9.1 g of 2-hydroxy ethyl methacrylate was added and the reactor was heated to 90° C. until no isocyanate could be detected by infrared. The system was cooled to 80 C and 53 g of MEK and 57 g of isopropyl alcohol IPA were added. A dispersion of the resin was made by adding 7.12 g (0.08 eq.) of dimethyl amino ethanol to neutralize the carboxylic acid groups of the diol amide acid obtained from the reaction of diisopropanol amine with glutaric anhydride. Afterwards 630 g of water was added over 10 minutes with vigorous stirring. The dispersion was placed under vacuum to remove the MEK and IPA solvents and yielded a product in water with a pH of 8.4, solids of 38.5%, particle size of 77 nm, polydispersity of 0.177 and a viscosity of 100 mPa·s (100 centipoise (cps)). Sample was visually stable without formation of sediment nor phase separation nor a high increase of viscosity (resulting in a gel like material) was observed when stored at room temperature for at least two months. The sample also remained visually stable without formation of sediment nor phase separation nor a high increase of viscosity (resulting in a gel like material) was observed when stored in the oven at 50° C. for 30 days.

Example 2: Preparation of a OH-Terminated Fatty Ester Modified Urethane-Vinyl Polymer Hybrid Into a 1000 ml round bottom flask fitted fora stirrer and nitrogen blanket was charged with 247 g of a diol made from the diepoxide of bisphenol A and a linoleic acid (equivalent weight=450, OH number=120) (0.55 eq.) and 13.3 g of diisopropanol amine (0.2 eq.). The reactor was heated to 60° C. and 11.4 g of glutaric anhydride (0.1 eq.) was added over 5 minutes. The reaction of the amine with the anhydride was monitored by infrared until the anhydride band completely disappeared. 42.0 g second polyol (0.14 eq.) made by the reaction of glycerol with linoleic acid (equivalent weight=300, OH number=185) was added along with 21 g of a nonionic diol (0.04) made from TDI, diethanol amine and methoxy carbowax 750 from Dow Chemical Company (eq. wt.=510) in a molar ratio of 1:1:1. The mixture was stirred and heated to 60° C. and 52.4 g (0.4 eq.) of HMDI-12 and 44.4 g (0.4 eq.) of IPDI were added. After a few minutes 9.1 g of 2-hydroxy ethyl methacrylate was added and the reactor was heated to 90 C until no isocyanate could be detected by infrared. The system was cooled to 80° C. and 53 g of MEK and 57 g of isopropyl alcohol were added.

A dispersion of the resin was made by adding 3.56 g (0.04 eq.) of dimethyl amino ethanol to neutralize the carboxylic acid groups of the diol amide acid obtained from the reaction of diisopropanol amine with glutaric anhydride. Afterwards 630 g of water was added over 10 minutes with vigorous stirring. To the dispersion was added 110 g of methyl methacrylate followed by feeding the redox pair of Brug-golite FF6M (sourced from Bruggeman Chemical) 2.2 g in 55 g water plus 3.14 g t-butylhydroperoxide 70% in 31 g of water over a period of 1 hour. The dispersion was placed under vacuum to remove the MEK and IPA solvents and yielded a product in water with a pH of 7.52, solids of 46.5%, particle size of 116 nm, polydispersity of 0.07 and a viscosity of 462 mPa·s (462 cps). Sample was visually stable at room temperature without formation of sediment nor phase separation nor a high increase of viscosity (resulting in a gel like material) was observed for at least 2 months.

Example 3: Preparation of a OH-Terminated Fatty Ester Modified Polyurethane

Into a 1000 ml round bottom flask fitted fora stirrer and nitrogen blanket was charged with 247 g of a diol made from the diepoxide of bisphenol A and a linoleic acid (equivalent weight=450, OH number=120) (0.55 eq) and 13.3 g of diisopropanol amine (0.2 eq.). The reactor was heated to 60° C. and 11.4 g of glutaric anhydride (0.1 eq.) was added over 5 minutes. The reaction of the amine with the anhydride was monitored by infrared until the anhydride band completely disappeared. 22.5 g of a second polyol (0.08 eq) made by the reaction of glycerol with linoleic acid (equivalent weight=300, OH number=185) was added along with 21 g of a nonionic diol (0.04 eq.) made from TDI, diethanol amine and methoxy carbowax 750 from Dow Chemical Company (eq. wt.=510) in a molar ratio of 1:1:1. The mixture was stirred and heated to 60° C. and 52.4 g (0.4 eq.) of HMDI-12 and 44.4 g (0.4 eq.) of IPDI were added. After a few minutes 9.1 g of 2-hydroxy ethyl methacrylate was added and the reactor was heated to 90° C. until no isocyanate could be detected by infrared. The system was cooled to 80° C. and 53 g of MEK and 57 g of isopropyl alcohol IPA were added.

A dispersion of the resin was made by adding 7.12 g (0.08 eq.) of dimethyl amino ethanol to neutralize the carboxylic acid groups of the diol amide acid obtained from the reaction of diisopropanol amine with glutaric anhydride. Afterwards 550 g of water was added over 10 minutes with vigorous stirring. The dispersion was placed under vacuum to remove the MEK and IPA solvents and yielded a product in water with a pH of 7.24, solids of 44.7%, particle size of 121 nm, polydispersity of 0.078 and a viscosity of 51 mPa·s (51 cps). Sample was visually stable at room temperature without formation of sediment nor phase separation nor a high increase of viscosity (resulting in a gel like material) was observed for at least 2 months.

Example 4: Preparation of a OH-Terminated Fatty Ester Modified Polyurethane

Into a 1000 ml round bottom flask fitted fora stirrer and nitrogen blanket was charged with 247 g of a diol made from the diepoxide of bisphenol A and a linoleic acid (equivalent weight=450, OH number=120) (0.55 eq) and 13.3 g of diisopropanol amine (0.2 eq). The reactor was heated to 60° C. and 11.4 g of glutaric anhydride (0.1 eq) was added over 5 minutes. The reaction of the amine with the anhydride was monitored by infrared until the anhydride band completely disappeared. 22.5 g of a second polyol (0.08 eq) made by the reaction of glycerol with linoleic acid (equivalent weight=300, OH number=185) was added along with a 21 g of a nonionic diol (0.04 eq) made from TDI, diethanol amine and methoxy carbowax 750 from Dow Chemical Company (eq. wt.=510) in a molar ratio of 1:1:1. The mixture was stirred and heated to 60° C. and 52.4 g (0.4 eq.) of HMDI-12 and 44.4 g (0.4 eq.) of IPDI were added. After a few minutes 9.1 g of 2-hydroxy ethyl methacrylate was added and the reactor was heated to 90° C. until no isocyanate could be detected by infrared. The system was cooled to 80° C. and 53 g of MEK and 57 g of isopropyl alcohol were added.

A dispersion of the resin was made by adding 7.12 g (0.08 eq) of dimethyl amino ethanol to neutralize the carboxylic acid groups of the diol amide acid obtained from the reaction of diisopropanol amine with glutaric anhydride. Afterwards 550 g of water was added over 10 minutes with vigorous stirring. The dispersion was placed under vacuum to remove the MEK and IPA solvents and yielded a product in water with a pH of 8.4, solids of 50%, particle size of 124 nm, polydispersity of 0.067 and a viscosity of 850 mPa.s (850 cps). Sample was visually stable at room temperature without formation of sediment nor phase separation nor a high increase of viscosity (resulting in a gel like material) was observed for at least two months.

Example 5: Preparation of a NCO Terminated Polyurethane

Into a reactor kettle equipped with an overhead stirrer, thermometer and nitrogen source was placed 93.5g Diexter-G 6555-120 polyol (saturated linear polyester which is a poly(hexamethylene/neopentyl adipate) glycol with 55/45 molar ratio of 1,6-hexanediol/neopentyl glycol, sourced from Coim USA inc.) and 4.66 g diisopropanol amine. The two components were mixed and heated to 50° C. Once temperature was reached 3.99 g glutaric anhydride was added in shots while mixing. Components were heated to 60° C. and mixed for 30 minutes. After 30 minutes, 9.47 g of a nonionic diol (0.04 eq) made from TDI, diethanol amine and methoxy carbowax 750 from Dow Chemical Company (eq. wt.=510) in a molar ratio of 1:1:1 was added and mixed in. Following that, 75.24 g HMDI-12 isocyanate was added and mixed well for 10 minutes. Then 25.0 g MEK was added to the reactor. The reactor was then heated to 78° C. and maintained this temperature until the prepolymer has a practical NCO % of 6.05%. The prepolymer was then cooled to 55° C. and 25.0 g Acetone was added followed by neutralization with 2.12 g triethylamine. The urethane dispersion was then made by pouring the 50° C. neutralized prepolymer into a solution of 277 g water, 0.37 g sodium bicarbonate, 1.2 g Surfynol 465 (nonionic dynamic wetting agent for surface tension reduction, sourced from Air Products) at 20° C. over a 20-minute period. Once all the neutralized prepolymer was added to the water it was allowed to mix for another 5 minutes before 24.44 g of 16% hydrazine solution was added to chain extend the urethane polymer. The MEK and acetone were stripped off via rotovaporizor. The polyurethane dispersion had: pH of 7.51, viscosity of 48 mPa·s (48 cps), solids at 47.0%, a particle size of 184 nm, and a polydispersity of 0.27. Sample appears visually stable without formation of sediment nor phase separation nor a high increase of viscosity (resulting in a gel like material) was observed when stored at room temperature for at least 10 days. The sample also remained visually stable without formation of sediment nor phase separation nor a high increase of viscosity (resulting in a gel like material) was observed when stored in the oven at 50° C. for 30 days.

Example 6: Preparation of a NCO Terminated Polyurethane

Into a reactor kettle equipped with an overhead stirrer, thermometer and nitrogen source was placed 93.5 g Diexter-G 6555-120 polyol and 12.64 g diisopropanol amine. The two components were mixed and heated to 50° C. once temperature was reached 9.69 g glutaric anhydride was added in shots while mixing. Components were heated to 60° C. and mixed for 30 minutes. After 30 minutes, 11.14 g of a nonionic diol (0.04 eq) made from TDI, diethanol amine and methoxy carbowax 750 from Dow Chemical Company (eq. wt.=510) in a molar ratio of 1:1:1 was added and mixed in. Following that, 105.6 g HMDI-12 isocyanate was added and mixed well for 10 minutes. Then 30.0 g MEK was added to the reactor. The reactor was then heated to 78° C. and maintained this temperature until the prepolymer reached the practical NCO value of 6.42%. The prepolymer was then cooled to 55° C. and 30.0 g Acetone was added followed by neutralization with 5.16 g triethylamine. The urethane dispersion was then made by pouring the 50° C. neutralized prepolymer into a solution of 377 g water, 0.37 g sodium bicarbonate, 1.2 g Surfynol 465 at 20° C. over a 20-minute period. Once all the neutralized prepolymer was added to the water it was allowed to mix for another 5 minutes before 32.15 g of 16% hydrazine solution was added to chain extend the urethane polymer. The MEK and acetone were stripped off via rotovaporizor. The polyurethane dispersion had: pH of 7.2, viscosity of 200 mPa·s (200 cps), solids at 44.4%, particle size of 60 nm, and polydispersity of 0.08. Dispersion was diluted down to 32% solids with water, which then remained stable at room temperature without formation of sediment nor phase separation nor a high increase of viscosity (resulting in a gel like material) was observed for at least two weeks.

Example 7: Preparation of a OH-Terminated Fatty Ester Modified Urethane-Vinyl Polymer Hybrid Into a 1000 ml round bottom flask fitted fora stirrer and nitrogen blanket was charged with 250 g of a diol made from the diepoxide of bisphenol A and a linoleic acid (equivalent weight=450, OH number=120) (0.56 eq) and 13.3 g of diisopropanol amine (0.2 eq.). The reactor was heated to 60° C. and 15.2 g of tetrahydrophthalic anhydride (0.1 eq.) was added over 5 minutes. The reaction of the amine with the anhydride was monitored by infrared until the anhydride band completely disappeared. 42 g of a second polyol (0.14 eq.) made by the reaction of glycerol with linoleic acid (equivalent weight=300, OH number=185) was added along with 17.3 g of a nonionic diol (0.033) made from TDI, diethanol amine and methoxy carbowax 750 from Dow Chemical Company (eq. wt.=510) in a molar ratio 1:1:1. The mixture was stirred and heated to 60° C. and 43.2 g.(0.32 eq.) of HMDI-12 and 52.2 g (0.47 eq.) of IPDI were added. After a few minutes 9.1 g of 2-hydroxy ethyl methacrylate was added and the reactor was heated to 90° C. until no isocyanate could be detected by infrared. The system was cooled to 80° C. and 85 g of methyl methacrylate MMA and 90 g of isopropyl alcohol were added.
A dispersion of the resin was made by adding 5.34 g (0.06 eq.) of dimethyl amino ethanol to neutralize the carboxylic acid groups of the diol amide acid obtained from the reaction of diisopropanol amine with tetrahydrophthalic anhydride. Afterwards 600 g of water was added over 10 minutes with vigorous stirring. To the dispersion was added the redox pair of Bruggolite FF6M 1.89 g in 45 g water plus 2.7 g t-butylhydroperoxide 70% in 25 g of water over a period of 1 hour. The dispersion was placed under vacuum to remove the IPA solvent and yielded a product in water with a pH of 7.5, solids of 52%, particle size of 197 nm, polydispersity of 0.06 and a viscosity of 69 mPa·s (69 cps). Sample remained visually stable at room temperature without formation of sediment nor phase separation nor a high increase of viscosity (resulting in a gel like material) was observed for at least 2 months.

Example 8: Preparation of a NCO Terminated Polyurethane

Into a reactor kettle equipped with an overhead stirrer, thermometer and nitrogen source was placed 93.5g Diexter-G 6555-120 polyol ((0.2 eq) and 3.06 g diisopropanol amine (0.05 eq). The two components were mixed and heated to 60 C. 2.62 g of glutaric anhydride (0.023 eq) was added and mixed for 30 minutes. The reaction of the amine with the anhydride was monitored by infrared until the anhydride band completely disappeared. 9.47 g of a non-ionic diol made from TDI, diethanol amine and methoxy carbowax 750 from Dow Chemical Company (eq wt 557, 0.017 eq) in a molar ratio 1:1:1 was added and mixed for 10 min. Add 75.24 g HMDI-12 (0.570 eq) and mix 10 min. Add 25 g MEK and heat and mix at 78 C for 2.5 hrs until % isocyanate was 5.98%. Cooled to 55 C and added 25 g of acetone to dilute, along with triethylamine 1.40 g (0.0138 eq). Dispersed into water prepared with sodium bicarbonate (0.37 g) and surfactant Surfynol 465 (1.2 g) over 5 min, maintaining temp between 28-32 C. Extend the polymer with 23.84 g hydrazine (16% solution, 0.238 eq). MEK and acetone were stripped off via rotovaporizor. The final dispersion had 46.25% solids, a particle size of 209 nm, and a polydispersity of 0.3. Sample was visually stable at room temperature without formation of sediment nor phase separation nor a high increase of viscosity (resulting in a gel like material) was observed for at least 3 months.

Comparative Experiment A: Preparation of a Fatty Ester Modified Polyurethane Into a 1000 ml round bottom flask fitted fora stirrer and nitrogen blanket was charged with 354 g of a diol made from the diepoxide of bisphenol A and a linoleic acid (equivalent weight=450, OH number=120) (0.75 eq.) and 10.7 g of dimethylol propionic acid (0.16 eq). 26 g of a nonionic diol (0.05) made from TDI, diethanol amine and methoxy carbowax 750 from Dow Chemical Company (eq. wt.=510) in a molar ratio 1:1:1 was added. The mixture was stirred and heated to 60° C. and 83.3 g (0.75 eq.) of IPDI was added. The reactor was heated to 90° C. until no isocyanate could be detected by infrared. The system was cooled to 60° C. and 198 g of acetone was added. The acid groups of 2,2-dimethylol propionic acid were neutralized by adding 8.9 g (0.09 eq.) of triethyl amine. Then 645 g of water was added over 10 minutes with vigorous stirring resulting in a thick gel like paste and not a fluid dispersion.

Comparative Experiment B: Preparation of a Fatty Ester Modified Polyurethane Similar to Ex 1

Into a 1000 ml round bottom flask fitted fora stirrer and nitrogen blanket was charged with 247 g of a diol made from the diepoxide of bisphenol A and a linoleic acid (equivalent weight=450, OH number=120) (0.52 eq) and 13.4 g (0.2 eq.) of 2,2-dimethylol propionic acid. 42 g of a second polyol (0.14 eq.) made by the reaction of glycerol with linoleic acid (equivalent weight=300, OH number=185) was added along with a nonionic diol 21 g (0.04) made from TDI, diethanol amine and methoxy carbowax 750 from Dow Chemical Company (eq. wt.=510) in a 1:1:1 molar ratio. The mixture was stirred and heated to 60° C. and 52.4 g (0.4 eq.) of HMDI-12 and 44.4g (0.4 eq.) of IPDI were added. After a few minutes 9.1 g of 2-hydroxy ethyl methacrylate was added and the reactor was heated to 90° C. until no isocyanate could be detected by infrared. The system was cooled to 80° C. and 53 g of MEK and 57 g of isopropyl alcohol were added.

A dispersion of the resin was made by adding 7.12 g (0.08 eq.) of dimethyl amino ethanol to neutralize the carboxylic acid groups of 2,2-dimethylol propionic acid. Afterwards 630 g of water a was added over 10 minutes with vigorous stirring. As water was added the system became very thick and form a gel-paste and was not fluid.

Comparative Experiment C: Preparation of a Polyurethane Similar to Example 5

Into a reactor kettle equipped with an overhead stirrer, thermometer and nitrogen source was placed 93.5 g Diexter-G 6555-120 polyol and 4.69 g 2,2-dimethylol propionic acid. Components were heated to 60° C. and mixed for 30 minutes and then 9.47 g of a nonionic diol made by reaction of TDI, diethanol amine and methoxy carbowax 750 from Dow Chemical Company (eq. wt.=510) in a 1:1:1 molar ratio was added. Following that, 75.24 g HMDI-12 isocyanate was added and mixed well for 10 minutes. Then 25.0 g MEK was added to the reactor. The reactor was then heated to 78° C. and maintained this temperature until the prepolymer was just below the theoretical NCO value of 2.34%. The prepolymer was then cooled to 55° C. and 25.0 g acetone was added followed by neutralization with 2.12 g triethylamine. The neutralized urethane prepolymer at 50° C. was poured into a solution of 277 g water, 0.37 g sodium bicarbonate, 1.2 g Surfynol 465 at 20° C. over a 20-minute period. The prepolymer would not disperse and formed a solid mass at the bottom of the dispersion vessel.

In below Table 1 the invention using the amide acid diol compared to an ester acid diol and the traditional method of stabilizing urethane dispersion with DMPA.

TABLE 1

| | Example 1 | Example 5 | Comp Ex B | Comp Ex C |
|---|---|---|---|---|
| Stabilizer | Glutaric amide | Glutaric amide | Dimethylol propionic acid | Dimethylol propionic acid |
| pH | 8.4 | 7.51 | 8 | 7.7 |
| Solids % | 38 | 47 | | |
| Particle size nm | 77 | 184 | | |
| Polydispersity | 0.177 | 0.078 | | |
| Viscosity mPa · s (cps) | 100 | 48 | gelled | did not disperse |
| 30-day 50° C. Stability | passed | passed | not applicable | not applicable |
| Acid Number (mg KOH/g polymer) | 12.7 | 10.5 | 13.0 | 10.7 |
| Neutralized Acid Number | 10.1 | 6.3 | 10.5 | 6.4 |

The invention claimed is:

1. An aqueous dispersion comprising dispersed particles comprising a polyurethane, wherein the polyurethane comprises at least the following building blocks derived from
   a) at least one organic polyisocyanate,
   b) at least one carboxylate group-bearing isocyanate-reactive compound for providing chain-pendant carboxylate ionic dispersing groups in the polyurethane, and
   c) at least one organic isocyanate-reactive polyol,
   wherein at least one of the carboxylate group-bearing compounds b) has the following structural formula

(1)

wherein
   R1 is a divalent aliphatic hydrocarbon radical having from 2 to 8 carbon atoms or a divalent cycloaliphatic hydrocarbon radical having from 6 to 8 carbon atoms or a divalent aromatic hydrocarbon radical having from 6 to 8 carbon atoms,
   R2 and R3 are 2-hydroxypropyl.

2. The aqueous dispersion according to claim 1, wherein R1 is a divalent aliphatic hydrocarbon radical having from 3 to 6 carbon atoms or a divalent cycloaliphatic hydrocarbon radical having from 6 to 8 carbon atoms or a divalent aromatic hydrocarbon radical having from 6 to 8 carbon atoms.

3. The aqueous dispersion according to claim 1, wherein the polyurethane is the reaction product of at least
   A) at least one organic polyisocyanate,
   B') at least one carboxylic acid-bearing compound for providing chain-pendant carboxylate ionic dispersing groups in the polyurethane,
   C) at least one organic isocyanate-reactive polyol, and
   D) at least one neutralizing agent to neutralize at least a part of the carboxylic acid groups,
   wherein at least one of the carboxylic acid-bearing compounds B') has the following structural formula

(2)

wherein R1, R2 and R3 are as defined in claim 1.

4. The aqueous dispersion according to claim 3, wherein the carboxylic acid-bearing compound B') with structural formula (2) is the reaction product of diisopropanol amine and a cyclic acid anhydride selected from the group consisting of glutaric anhydride, tetrahydrophthalic anhydride, hexahydrophthalic anhydride and any mixture thereof.

5. The aqueous dispersion according to claim 3, wherein the carboxylic acid-bearing compound B') with structural formula (2) is the reaction product of glutaric anhydride and diisopropanol amine.

6. The aqueous dispersion according to claim 3, wherein at least 50 wt. % of component B') is according to structural formula (2).

7. The aqueous dispersion according to claim 3, wherein the polyurethane is the reaction product of at least (I) an at least partially neutralized isocyanate-terminated polyurethane prepolymer formed by reacting at least (A), (B'), (C) and (D) with a neutralization degree of from 125 to 25%, and (II) an active-hydrogen containing chain extending compound.

8. The aqueous dispersion according to claim 1, wherein the polyurethane has an acid number from 5 to 30 mg KOH/g of the polyurethane.

9. The aqueous dispersion according to claim 1, wherein the polyurethane is an uralkyd polymer comprising an unsaturated fatty acid residue containing ester polyol as polyol C) and wherein the amount of fatty acid residue is within the range of from 20 to 60 wt. %, relative to the total weight amount of components used to prepare the polyurethane from which the building blocks of the polyurethane are emanated.

10. The aqueous dispersion according to claim 1, wherein the organic polyisocyanate A) is a polyisocyanate containing at least two free isocyanate groups.

11. The aqueous dispersion according to claim 1, wherein the polyol C) is a polyester polyol, polyether polyol and/or polycarbonate polyol optionally in combination with fatty acid residue containing polyol.

12. The aqueous dispersion according to claim 1, wherein the dispersed particles further include at least one vinyl polymer and said vinyl polymer is obtained in-situ by the free-radical addition polymerization of one or more vinyl monomer in the presence of a preformed aqueous dispersion of the polyurethane according to claim 1 and wherein the acid number of the polyurethane-vinyl polymer hybrid is within the range of from 5 to 30 mg KOH/g of the polymer hybrid.

13. The aqueous dispersion according to claim 1, wherein the dispersed particles have a particle size determined according to the method identified in the specification of from 15 to 1000 nm, as determined by a nano particle size analyzer using a scattering angle of 90 degrees and the acid number of the dispersed polymer is from 5 to 30 mg KOH/g.

14. The aqueous dispersion according to claim 1, wherein the dispersed particles are present in the aqueous dispersion in an amount of from 20 to 60 wt. %, with a viscosity of the dispersion determined according to the method identified in the specification below 1000 mPa.s.

15. A coating or paint composition comprising the aqueous dispersion according to claim 1.

16. The aqueous dispersion according to claim 1, wherein $R_1$ is a divalent aliphatic hydrocarbon radical having 3 or 4 carbon atoms or a divalent cycloaliphatic hydrocarbon radical having from 6 to 8 carbon atoms or a divalent aromatic hydrocarbon radical having from 6 to 8 carbon atoms.

17. The aqueous dispersion according to claim 3, wherein at least 90 wt. % of component B') is according to structural formula (2).

18. The aqueous dispersion according to claim 1, wherein the polyurethane has an acid number from 6 to 16 mg KOH/g of the polyurethane.

19. The aqueous dispersion according to claim 1, wherein the polyurethane is an uralkyd polymer comprising an unsaturated fatty acid residue containing ester polyol as polyol C) and wherein the amount of fatty acid residue is within the range of from 30 to 45 wt. %, relative to the total weight amount of components used to prepare the polyurethane from which the building blocks of the polyurethane are emanated.

20. The aqueous dispersion according to claim 1, wherein the organic polyisocyanate A) is a diisocyanate $Y(NCO)_2$, wherein Y represents a divalent aliphatic hydrocarbon radical having from 4 to 10 carbon atoms, a divalent cycloaliphatic hydrocarbon radical having from 6 to 13 carbon atoms, a divalent aromatic hydrocarbon radical having from 6 to 13 carbon atoms or a divalent araliphatic hydrocarbon radical having from 7 to 15 carbon atoms.

* * * * *